United States Patent [19]

Bottcher

[11] Patent Number: 5,297,691

[45] Date of Patent: Mar. 29, 1994

[54] CLOSURE PLUG AND METHODS OF EMPLOYING THE SAME TO MAINTAIN A FIRE-RATED BARRIER

[76] Inventor: William R. Bottcher, 515 Garfield Ave., Somerset, N.J. 08873

[21] Appl. No.: 52,990

[22] Filed: Apr. 27, 1993

Related U.S. Application Data

[63] Continuation of Ser. No. 899,022, Jun. 15, 1992, abandoned, which is a continuation of Ser. No. 830,746, Feb. 7, 1992, abandoned, which is a continuation of Ser. No. 630,440, Dec. 20, 1990, abandoned, which is a continuation of Ser. No. 310,927, Feb. 16, 1989, abandoned.

[51] Int. Cl.[5] .............................................. B65D 53/00
[52] U.S. Cl. ..................................... 220/237; 220/235; 220/236; 220/88.1; 138/89
[58] Field of Search ............... 220/235, 233, 234, 236, 220/237, 88.1; 138/89

[56] References Cited

U.S. PATENT DOCUMENTS

| | | | |
|---|---|---|---|
| 100,115 | 2/1870 | Brown | 220/237 |
| 1,369,882 | 3/1921 | Brown | 220/235 |
| 2,139,491 | 12/1938 | Dawson . | |
| 2,720,893 | 10/1955 | Foreman | 138/89 |
| 3,326,404 | 6/1967 | Gardner | 220/235 |
| 3,443,716 | 5/1969 | Evans | 220/235 |
| 3,618,809 | 11/1971 | Martino . | |
| 3,655,907 | 4/1972 | Philibert et al. . | |
| 3,667,640 | 6/1972 | Morrow | 220/235 |
| 3,749,131 | 7/1973 | Burger . | |
| 3,911,635 | 10/1975 | Traupe . | |
| 4,061,344 | 12/1977 | Bradley et al. . | |
| 4,380,302 | 4/1983 | Broad | 220/235 |
| 4,432,465 | 2/1984 | Wuertz . | |
| 4,493,344 | 1/1985 | Mathison et al. . | |
| 4,503,880 | 3/1985 | Hochman . | |
| 4,671,518 | 6/1987 | Retz . | |
| 4,762,151 | 8/1988 | Kinnan | 138/89 |
| 4,817,671 | 4/1989 | Mathison | 138/89 |

FOREIGN PATENT DOCUMENTS

| | | | |
|---|---|---|---|
| 606503 | 11/1934 | Fed. Rep. of Germany | 138/89 |
| 105159 | 4/1917 | United Kingdom | 220/235 |
| 587289 | 4/1947 | United Kingdom | 220/235 |

Primary Examiner—Allan N. Shoap
Assistant Examiner—Stephen K. Cronin

[57] ABSTRACT

A closure plug consisting of opposing frusco-conical sections to apply lateral forces to axially compress and radially expand o-ring means to seal the plug within an opening through a fire-rated barrier may support or enclose insulating materials filling all or part of the opening through the barrier.

6 Claims, 4 Drawing Sheets

CLOSURE PLUG AND METHODS OF EMPLOYING THE SAME TO MAINTAIN A FIRE-RATED BARRIER

This application is a continuation of U.S. application Ser. No. 07/899,022 filed Jun. 15, 1992, now abandoned which is a continuation of U.S. application Ser. No. 07/830,746 filed Feb. 7, 1992, now abandoned which is a continuation of U.S. application Ser. No. 07/630,440, filed Dec. 12, 1990 now abandoned which is a continuation of U.S. Ser. No. 07/310,927 filed Feb. 16, 1989 now abandoned.

TECHNICAL FIELD

In general, the present invention relates to closures and more particularly to a closure plug, and method of employing the same, to effectively seal and plug an opening in a fire-rated barrier such as a concrete floor or the like, so as to maintain its fire-rating. The specific embodiment herein disclosed is a mechanically operable plug device for the removable sealing of such openings in fire-rated barriers and is adjustable to match the barrier thickness and need for low heat transfer. Additionally, fire retardant and fire suppressant materials may be utilized along with insulating materials in conjunction with the plugs of the present invention to produce and maintain the desired fire-rating consistent with that provided by the barrier itself.

Cross Reference to Related Applications

At the present time this application constitutes the sole application by this applicant and assignee directed to the Claimed Subject Matter.

BACKGROUND OF THE INVENTION

It is common practice in building construction to provide electrical, telephone, plumbing and other service openings through barriers such as concrete floors, walls and ceilings, at the time the building is constructed and finished. While some of these openings may be used initially, others are reserved for future use. The barriers, being poured or cast concrete or the like, represent good fire barriers.

In some cases for a wide variety of reasons it may, also, be necessary at a later date to drill additional core holes for electrical, telephone or plumbing outlets in barrier floors, walls or ceilings. When outlets have to be moved, one is left with a hole which may typically be six inches deep and approximately three inches in diameter.

Such openings, cast or drilled, through an otherwise good fire barrier can reduce the integrity of the barriers and present potential fire and heat passageways. It is desirable to provide a closure fitting for each such opening, as such closures are needed, to thereby restore the integrity of the barrier.

Some solutions, such as currently available fire stops, leave an unsightly and dangerous metal plate exposed as well as being both individually and collectively costly.

A variety of other related technical solutions which have failed to totally successfully solve the problem in a commercially successful fashion will be touched upon in passing in the discussion of the known prior art provided below.

BACKGROUND ART

The following discussion of the prior art known to applicant at the time of filing this case is intended to be an information disclosure statement in accordance with 37 CFR 1.97 and 1.98 and to comply with the duty of disclosure set forth in 37 CFR 1.56.

U.S. Pat. No. 4,493,344, issued Jan. 15, 1985, to Mathison, Nelson and Cherne of Cherne Industries, Inc., discloses a mechanically operable plug device for removably sealing a conduit end so that the conduit can be tested for leaks. The present invention differs from this prior art reference by not employing an outer plate having a diameter greater than the diameter of the hole to be plugged as to do so would be inconsistent with the intended purpose of the present invention to provide an adjustable plug which may form its seal well inside any hole to be plugged so that the distance to be filled with insulating material may be controlled and varied to produce the desired fire-rating consistent with the rating of the original barrier while at the same time providing a level surface in conformity with the original barrier surface.

U.S. Pat. No. 2,139,491, issued Dec. 6, 1938, to Dawson, discloses a flue stop and fire check with metal end members.

U.S. Pat. No. 3,618,809, issued Nov. 9, 1971, to Martino of Havaco Corp., discloses a releasable fluid seal for conduits employing a cup of elastomeric material which fits into the conduit and upon the tightening of a wing nut is caused to bow into a fluid tight seal with the inner wall of the conduit.

U.S. Pat. No. 3,655,907, issued Apr. 11, 1972, to Philibert and Browne of O. Z. Electrical Manufacturing Co., discloses a conduit cable seal employing a clamping means of the two steel plates sandwiching a resilient sealing member.

U.S. Pat. No. 3,749,131, issued Jul. 31, 1973, to Burger of Oliver Tire & Rubber Co., discloses a plug assembly for sealing the open-end of a pipe by use of an elastomeric sealing member between washer plates of different diameters.

U.S. Pat. No. 3,911,635, issued Oct. 14, 1975, to Traupe, discloses an expandable under-floor and under-plaster plug in which clamping members force a tightening element of spring steel into frictional engagement with the wall of the outlet.

U.S. Pat. No. 4,061,344, issued Dec. 6, 1977, to Bradley and Sullivan of General Signal Corp., discloses a fitting for penetration through fire-rated barriers in which an elastomeric-like material under pressure provides an initial barrier and an intumescent material, which responds to heat, is provided to expand and fill any void created by the degeneration of the elastomeric material in response to heat or fire. The structure disclosed provides a metal heat conducting path from one side of the barrier to the other which in certain instances may not be desirable.

U.S. Pat. No. 4,432,465, issued Feb. 21, 1984, to Wuertz of Harvey Hubbell, Inc., seeks to overcome the perceived deficiencies of U.S. Pat. No. 4,061,344 by use of dual pressure plates which expand an annular gripping ring to grip the inner surface of the opening being filled and suspending therefrom by a low heat transfer member a body of intumescent material.

U.S. Pat. No. 4,503,880, issued Mar. 12, 1985, to Hochman of the Wisconsin Gas Co., discloses a lockout plug for use within a pipe which has case-hardened steel washers sandwiching an elastomeric expansion plug.

U.S. Pat. No. 4,671,518, issued Jun. 9, 1987, to Retz of Westinghouse Electric Corp., discloses an expandable inflatable circular plug for sealing bore holes in a reactor vessel.

As will be apparent from the above discussion, many prior art efforts have been made to successfully solve the subject and similar problems. While many or all have had some success, it is also apparent that none have been completely successful in all, or even in a wide variety of, circumstances and applications. At least in part and with 20/20 hindsight it may be seen that among the reasons for such problems in and with the prior art is a tendency to be overly complex while at the same time failing to provide the necessary, desired flexibility for a wide variety of applications.

DISCLOSURE OF THE INVENTION

Accordingly, it is an object of the present invention to provide a new, highly effective device and method which overcomes the deficiencies of the prior art as described above.

It is a further object of the present invention to provide a device which will permit the closing, maintenance and restoration of the essential character of a fire-rated barrier after utility outlets have been molded or drilled.

Another object of the present invention is to provide a method of achieving the same.

An additional object is to provide a solution to the above enumerated problems which works well, saves time and eliminates a liability factor by restoring all or at least a significant part of the barrier's fire-rating.

The above and still further objects, features and advantages of the present invention, as well as a fuller understanding of the invention per se, will be made apparent upon consideration of the following detailed description of the several specific embodiments thereof, and by reference to the following claims, especially when taken in conjunction with the accompanying drawings.

SUMMARY OF THE INVENTION

The present invention overcomes the deficiencies of the prior art as noted above and achieves its objectives by providing a closure plug consisting of opposing frusco-conical sections to apply lateral forces to axially compress and radially expand an o-ring to seal said plug within an opening through a fire-rated barrier to support or enclose insulating materials which may fill all or part of the opening through the said barrier.

BRIEF DESCRIPTION OF THE DRAWINGS

For order to facilitate the understanding of the present invention, reference will now be made to the appended drawings of preferred embodiments of the present invention. The drawings should not be construed as limiting the invention, but are exemplary only. In the drawings.

DESCRIPTION OF THE BEST MODE FOR CARRYING OUT THE INVENTION AND THE PREFERRED EMBODIMENTS THEREOF

Figure 1:
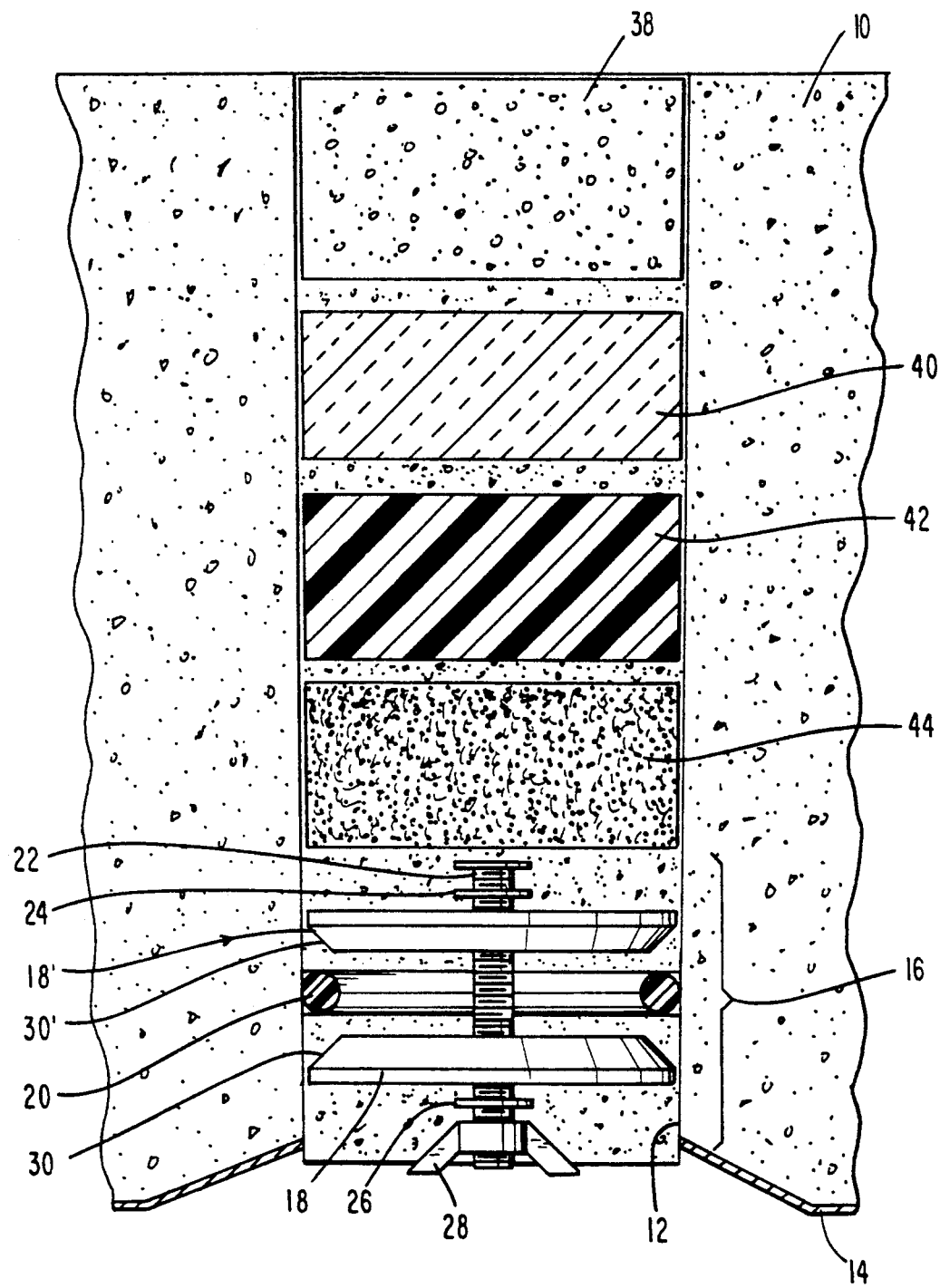
FIG. 1 is a partial cross-sectional, exploded representation of the present invention.

A preferred embodiment of the present invention is shown in FIG. 1 in which (10) represents a concrete barrier, such as a floor having hole, defined by internal surface (12), molded or drilled in and through it. The floor may typically be backed by metal deck (14).

Inserted within the hole, in accordance with the present invention, is plug (16) which consists of two opposed pressure plates (18) and (18') sandwiching an elastomeric o-ring member (20). Passing through a centrally disposed hole in plates (18),(18') is a threaded bolt (22) which passes through a sealing washer (24) before entering pressure plate (18') where notched or flattened surfaces present rotation of bolt (22). Bolt (22) passes centrally through o-ring (20) and thence through pressure plate (18). On the other side of pressure plate (18), the bolt (22) then passes through a low coefficient of friction washer (26) before being engaged by wing nut (28).

Figure 4:
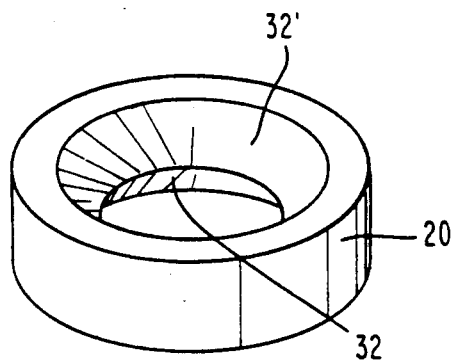
FIG. 4 is a perspective view of one form of the preferred embodiment of the o-ring employed in the present invention.

The detailed structure of some of the above described elements may be had by reference to several of the later drawings. For example, the best mode, preferred embodiment of the o-ring (20) is shown in FIG. 4, which further illustrates that in this embodiment the interior circumferential face of the o-ring may be tapered in the molding process of forming such an o-ring to have a pair of inclined surfaces (32),(32') forming a diamond or triangular shape coincident and matching with that surface provided by the inclined taper of the frusco-conical section (30),(30') of each of the pressure plates (18),(18'). This principle is further illustrated in FIG. 5b, 5c and 5d in each of which the inclined tapered surface (30),(30') of the frusco-conical section of pressure plates (18),(18') is shown in coincident contact with the inner circumferential, inclined tapered surface (32),(32') of the o-ring (20). In FIG. 5b the o-ring (20) is semi-circular. In FIG. 5c the outer circumferential surface of the o-ring (20) is triangular or diamond shaped. In FIG. 5d the outer circumferential surface of the o-ring (20) is flat being the outer surface of a substantially rectangular element. For most surfaces it is preferred to employ an o-ring of the shape shown in FIG. 5b or 5c although other shapes may work as well in a particular application.

Figure 5A:
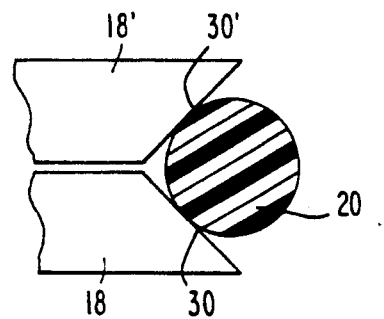
FIGS. 5a, 5b, 5c and 5d are four cross-sectional representations of four of the preferred embodiments of the o-rings and their cooperation with the plate for applying lateral force to the o-rings.
Figure 5B:
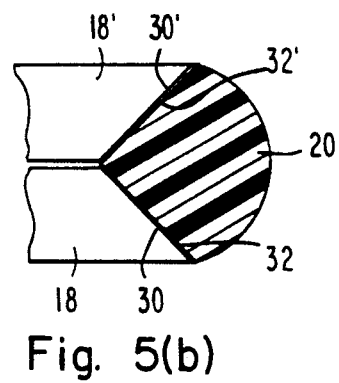
Figure 5C:
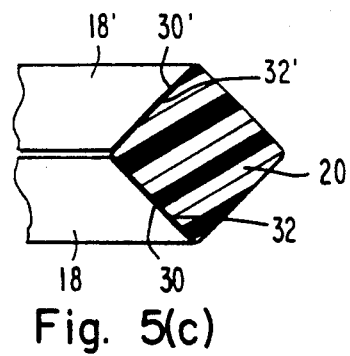
Figure 5D:
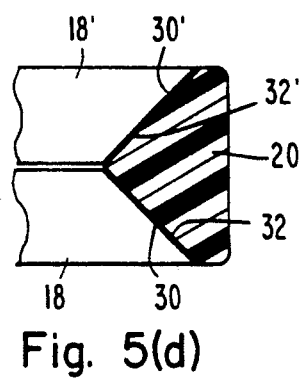

The further embodiment of FIG. 5a merely illustrates that an ordinary o-ring of circular cross-section may be employed in accordance with the present invention.

Figure 6:
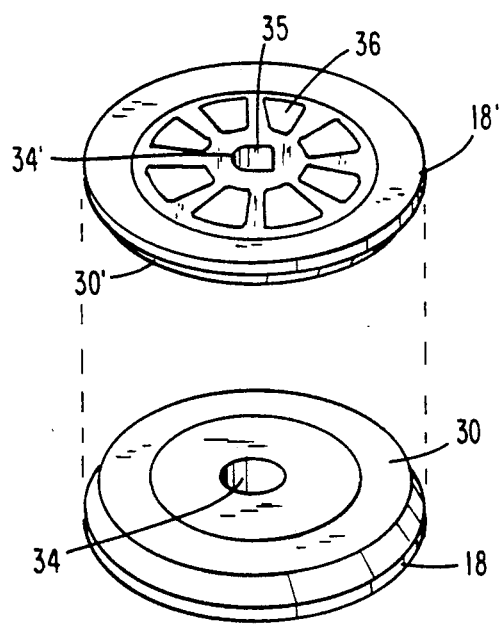
FIG. 6 is a perspective view of the upper and lower pressure plate in accordance with the present invention.

The pressure plates (18),(18') are further illustrated in FIG. 6. A frusco-conical section (30),(30') on each pressure plate (18),(18') provides the inclined, tapered face that engages the interior surface of the o-ring (20) to transmit lateral forces thereto as the pressure plates (18),(18') are drawn together by the tightening of the wing nut (28) on bolt (22). Bolt (22) passes through central openings (34),(34') in pressure plates (18),(18'). A portion of the central opening (34) may be notched or flattened as at (35) to prevent the undesired rotation of bolt (22). Each of the pressure plates (18),(18') may have indented sections (36) introduced in the molding or forming process of their manufacture to lighten the weight of the pressure plates (18),(18') without significantly reducing their strength.

The pressure plates (18),(18') may preferably be made from any high melting temperature metal such as steel, preferably stainless steel. If desired, regardless of the materials of construction, the metal plates (18),(18') may be further coated with insulating materials, such as polyvinyl chloride or intumescent paint such as Latex 744B of Dow Chemical Co., a vinyl water emulsion compounded with pentaerythritol, dicyandiamide, and monosodium phosphate. Plates (18),(18') may also be made from zinc-plated steel or aluminum.

Alternatively, plates (18),(18') may be molded plastic, preferably treated or filled with fire and flame retardant materials. These materials are set forth in general at pages 553-558 of the 1989 (Mid-Oct., 1988) *Modern Plastics Encyclopedia*, McGraw-Hill (v. 65, no. 11), 1988. A further definition of materials for use in the present invention is found at pages 1-64 of vol. 7 of Interscience Publishers, *Encyclopedia of Polymer Science and Technology*, John Wiley & Sons, Inc., 1967. Among the material suitable for forming plates (18),(18') are the thermoplastic polymides, nylon resins including Zytel nylon, nylon resins designated type 6/10, 6/6 and 6 by the 1971-1972 *Modern Plastics Encyclopedia*, polyacetal, polyvinylilene chloride, polyester, diallylphthalate, polytetra fluora ethylene, polychloro-trifluoro ethylene, polymethyl alpha chloroacrylate, thermo-plastic polyamide resin, polyphenylene sulfide and the like. These materials may be filled with clay, silica, sodium alumino silicates, aluminum trihydrate, sodium alumino carbonates, magnesium oxide, calcium silicates, and similar fire retardant fillers.

Washer (24) may be made of plastic or rubber, while it is preferred to make washer (26) of nylon or another low coefficient of friction plastic material.

The elastomeric o-ring (20) may be plasticized polyvinyl chloride, rubber, neoprene, urethane or ethylene propylene diene monomer (EPDM). Preferably the neoprene used will have a durometer hardness of between 35 and about 45. Chloral sulfarated polyethylene (CSPE), sold by Du Pont under the tradename HYPALON, may also be employed in accordance with the present invention. These materials may also be, and preferably are, filled with flame retardant fillers or coatings as taught above.

The surface of the frusco-conical section (30),(30') and/or the inner surface of the o-ring (20) may be ribbed or notched to prevent undesired relative rotation.

The incline or slope of the frusco-conical section (30),(30') may generally be approximately 40° to 45° but may be as large as 60°.

Figure 2:
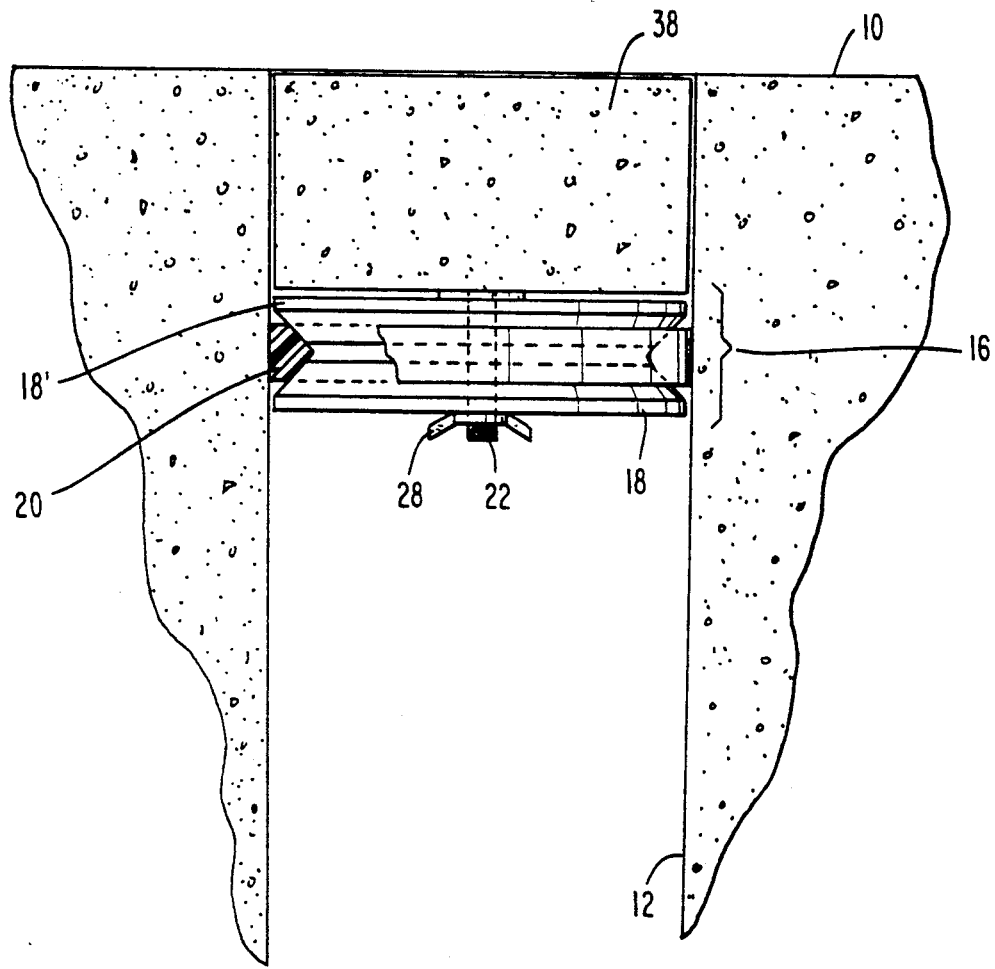
FIG. 2 is a further partial cross-sectional representation of another embodiment of the present invention.

In operation as shown, for example, in FIG. 2 the plug (16) configured as set forth above is inserted in an opening (12) in barrier (10) and the wing nut (28) tightened on bolt (22) to bring pressure plates (18),(18') together axially. As this is done, the frusco-conical sections with inclined faces (30),(30') create lateral forces on the o-ring (20) to axially compress and radially expand the o-ring (20) to seal against the inner surface wall (12) of the opening through barrier (10). The plug (16) may, of course, be positioned at any desired location within the opening (12) relative to the thickness of the barrier (10).

The barrier (10) when a concrete floor, may typically be 6 inches thick and the opening (12) may be on the order of 3 inches in diameter.

As shown in FIG. 2, a concrete cylinder (38) may be placed on the sealed plug (16) so as to form a level surface with the original surface of barrier (10). If desired, of course, the concrete cylinder may be sealed in place by known sealing agents, concrete, plaster or paris, caulk, epoxies and the like.

As shown in FIG. 1, additional laminar construction elements in addition to or in lieu of concrete cylinder (38) may be employed to various ends and purposes.

For example, a cylinder of thermally insulating material various well known ceramic materials, such as refractory concrete, graphite brick, tungsten carbide, Zircon and the like may be employed to increase the fire-rating. Such materials are set forth in the Plenum Press *Handbook of High Temperature Materials*, 1963. Various soft flexible materials in sheet or laminar forms may be employed such as Kapok, Cabot's quilt, balsam wool, Therofelt, rock-wool, glass wool, etc. Cellular gypsum and various woods, in sheet or laminar form, may be employed for their thermal insulating properties with or without treatment with fire retardants as taught above.

Additionally, layers of various plastics and resins (42) may be employed such as Keslar 49/acrylic insulation batts, 80/20, with or without additional fire retardant treatment. As taught above, any number of fillers may be employed with various plastics to provide the desired thermal insulation and fire (or flame) retardant or suppressing properties. See for example, p. 525 of Katz et al, *Handbook of Fillers and Reinforcements for Plastics*, Van Nostrand-Reinhold, 1978, and p. 591-605, vol. 13, Kirk-Othmer, *Encyclopedia of Chemical Technology* (Third Edition) Wiley-Interscience, 1981. Further, in laminar structures such as indicated at (42) carbon-graphite composites may be employed to advantage, see for example p. 374, Sitting, *Carbon and Graphite Fibers*, Chemical Technology Review, No. 162, Noyes, 1980.

In addition, the various fire retardant/suppressant fillers and granular materials may be encapsulated or placed within a canister (44) and placed upon plug (16) to further enhance the fire-rating.

Figure 3:
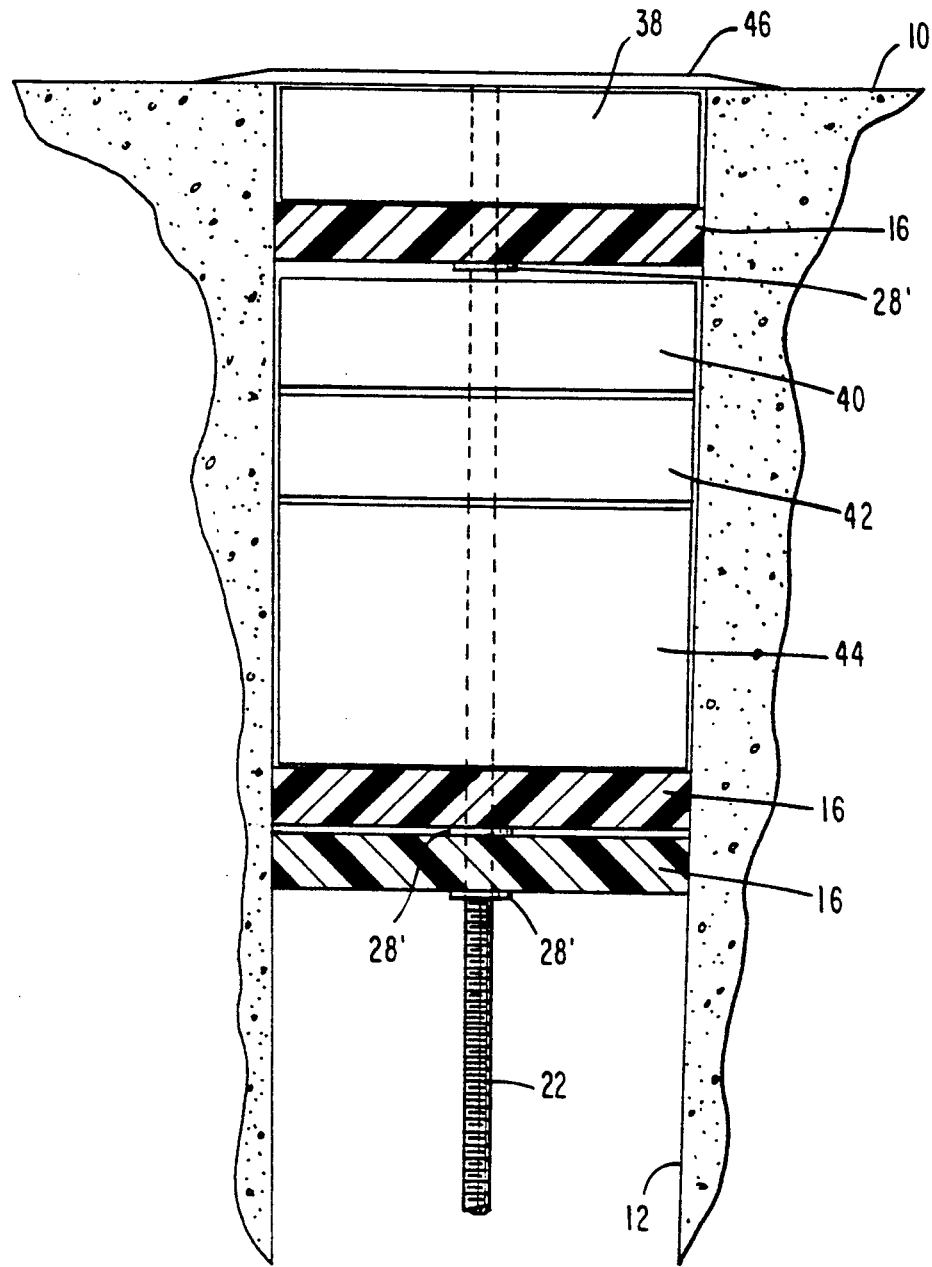
FIG. 3 is a partially schematic, partial cross-sectional representation of another embodiment of the present invention.

As shown in FIG. 3, if desired, a cover plate (46) may be employed over opening (12) in barrier (10). As shown in FIG. 3, the plug is schematically represented at (16) with a nut (28'). The cover plate may, of course, as shown be tapered and may be constructed of a wide variety of materials, plastics and metals, most preferably a tapered, zinc coated steel. A concrete cylinder (38) may be employed, as taught above, supported by plug (16). Other concrete cylinders (38) or the insulating materials (40), or flame retardant plastics (42) or ceramic or flame retardant materials per se (44) may be employed between additional plugs (16) which may be used in series if desired or needed for extra strength. The bolt (22) may, if desired, be segmented with insulating materials to prevent it being a path of heat transfer.

In summary, the present invention relates to a closure plug (16) consisting of opposing frusco-conical sections (30), (30') to apply lateral forces to axially compress and radially expand the o-ring (20) to seal said plug (16) within an opening (12) through a fire-rated barrier (10) which may support or enclose insulating materials (38), (40), (42), (44) filling all or part of the opening (12) through said barrier (10).

In particular, the present invention relates to a closure plug (16) for installation in a generally circular opening (12) in a fire-rated barrier (10) to maintain the integrity of the barrier (10). The opening (12) is defined by cylindrical side walls of the barrier material (10) extending between a circular entrance opening at one surface of the barrier material (10) and a circular exit opening in the opposite surface of the same or similar barrier or support material. The surface dimensions of the barrier or support materials (10) are relatively large with respect to the length of said opening (12), between the entrance and exit surfaces, in the direction transverse to the lengthwise axis of said opening (12). The closure plug (16) includes a generally annular radially expandably gripping o-ring (20) having a continuous circular peripheral surface of compressible elastomeric material for gripping and engaging the interior surface of the opening (12) passing through the barrier material (10) to fix the position of the plug within the barrier material (10). The o-ring (20) has an outer diameter equal to or less than that of the opening (12) passing through the barrier (10) when in an uncompressed state and has a lengthwise, longitudinal axial thickness significantly less than that of the barrier (10).

A pair of spacially parallel generally circular, rigid pressure plate members (18), (18') are adjacent to and on opposite sides of the o-ring (20). Each pressure plate member (18), (18') has an outer diameter smaller than the diameter of the opening (12) through the barrier material (10). Each plate member (18), (18') has interiorly facing parallel faced, axially aligned frusco-conical sections (30), (30'). Each section (30), (30') consists of the frustum of a right circular cone, so as to provide inclined tapered shoulders of the same predetermined slope to engage the interior surface of the o-ring (20). The incline of the tapered shoulders is typically in the range of from 40 to 60 degrees.

Also included are a threaded bolt (22) and a wing nut (28) extending between the pressure plate members (18), (18') to urge the plates toward each other to provide lateral forces to axially compress and radially expand the o-ring (20) against the internal surface of the cylindrical side walls (12) of the barrier material (10) subsequent to the placement of the closure plug (16) into the opening (12) in the barrier material (10). The positive adjustment of the threaded bolt and wing nut (22), (28) extending between the pressure plate members (18), (18') causes the sloped opposing shoulder of said frusco-conical sections (30), (30') to impart lateral forces to the interior surface of the o-ring (20) to cause it to expand outwardly to form a seal with the interior wall surface (12) of the opening through said barrier material (10). The o-ring member reaches its sealing diameter before the opposing pressure plate members (18), (18') make contact. Pressure plate members (18), (18') have central, axial apertures (34), (34') extending therethrough for receiving the threaded bolt (22) and wing nut (28). The bolt (22) has a head portion for non-rotationally engaging the flattened surface (35) of the plate member (18), (18'). The wing nut (28) is hand operable to adjustably impart lateral squeezing forces through said opposing tapered shoulders (30), (30') of plate members (18), (18') to radially expand the o-ring (20). A sealing washer member (24) is disposed between the bolt (22) head and adjacent plate member (18').

A washer member (26) having a low coefficient of friction is disposed between the wing nut (28) and the adjacent plate member (18). The sealing washer member (24) further insures the sealability of the plug. The low coefficient of friction washer (26) aids the tightening and untightening of the wing nut (28) on the threads of bolt (22).

Maintaining the integrity of a fire-rated barrier with a circular opening therethrough is achieved by inserting the closure plug (16) in the circular opening (12) through the barrier (10) from one side of the barrier (10). The lateral force is adjusted to seal the o-ring (20) in contact with the inner surface (12) of the opening through the barrier (10). One or more of the following insulating members may be placed in the opening through the barrier (10) from the opposite side of the barrier (10) from the side of the barrier (10) from which the plug (16) was inserted. The insulating member may be selected from the group consisting of: concrete (including refractory concrete), an insulating ceramic material, an insulating plastic material, a fire retardant material, an intumescent material, and combinations thereof in separate layers or commingled. The insulating members may be sealed at the surface of said barrier (10).

While throughout reference has been made for ease of description to circular and cylindrical sections. Obviously, other geometries and shapes may be employed in accordance with the present invention.

Further, while the present invention has been described, again for ease of description, in the context of a vertical hole (12) or opening in a concrete floor barrier (10), it should be clearly understood as suggested by FIG. 3 that the orientations may be horizontal as in a wall or at any other angle. The use of two or more plugs (16) makes it possible to accommodate and adapt the present invention to virtually any situation in which it may be found useful.

While the present invention has been described with reference to specific embodiments, it will be readily understood by those skilled in the art that various changes and modifications may be made and that equivalents may be substituted for various elements of the present invention without departing from the true spirit, and essence of, the invention. In addition, while operating within the scope of the present invention, many modifications may be made to adapt the invention to a particular situation or to adapt a particular material or materials to the teachings of the present invention without departing from its essential teachings. This application is intended to cover those various changes and substitutions which may be made by those skilled in the art without departing from the spirit and scope of the hereinafter appended claims.

What is claimed is:

1. A closure plug for installation in a generally circular opening in a fire-rated barrier to maintain the integrity of the barrier wherein said opening is at least in part defined by cylindrical side walls of a barrier material extending at least a portion of the way between a circular entrance opening at one surface of said barrier material and a circular exit opening in the opposite surface of the same or similar barrier or support material, wherein the surface dimensions of said barrier or support materials are relatively large with respect to the length of said opening, between the entrance and exit surfaces, in the direction transverse to the lengthwise axis of said opening, said closure plug comprising the combination of:

(a) a plurality of generally annular radially expandably gripping o-ring means, each o-ring means having a continuous circular peripheral surface of compressible elastomeric material for gripping and engaging the interior surface of said opening passing through said barrier material thereby fixing the position of said plug within said barrier material, each said o-ring means having an outer diameter equal to or less than that of the opening passing through said barrier when in an uncompressed state and having a lengthwise, longitudinal axial thickness significantly less than that of the barrier;

(b) a rigid pressure plate member having an outer diameter greater than the diameter of said opening through said barrier material, said plate member having an interior face, an outer portion of said interior face adapted to contact said one surface of said barrier material;

(c) a plurality of insulating members, at least one insulating member comprising a concrete cylinder being disposed between a first one of said o-ring means and said pressure plate member, and said other insulating members being disposed between said first one of said o-ring means and a second one of said o-ring means, said second one of said o-ring means being disposed on an opposite end of said closure plug from said rigid pressure plate member, said other insulating members including a ceramic cylindrical member, a carbon-graphite composite cylindrical member and a cylindrical canister containing fire retardant and suppressant material; and (d) means extending from said pressure plate member to and beyond said opposite end of said closure plug for urging said second one of said o-ring means toward said pressure plate member to provide lateral forces to axially compress and radially expand said o-ring means against the internal surface of said cylindrical side walls of said barrier material whereby subsequent to the placement of the said closure plug into the opening in said barrier material the positive adjustment of said means for urging extending from said pressure plate member to and beyond said opposite end of said closure plug causes the o-ring means to expand outwardly to form a seal with the interior wall surfaces of the opening through said barrier material.

2. The closure plug of claim 1 wherein said pressure plate member is of a unitary, molded, fire retardant plastic construction.

3. The closure plug of claim 1 wherein said pressure plate member is a metal selected from the group consisting of steel, zinc-plated steel, stainless steel and aluminum.

4. The closure plug of claim 1 wherein said o-ring means is of a deformable elastomeric material selected from the group of materials consisting of plasticized polyvinyl chloride, natural rubber, synthetic rubber and urethane containing a fire retardant filler selected from the group consisting of magnesium oxide, aluminum trihydrate, sodium alumino carbonate, calcium silicate, sodium alumino silicate, silica, and combinations thereof.

5. The closure plug of claim 1 wherein said pressure plate member has a central, axial aperture extending therethrough for receiving said means for urging said second one of said o-ring means toward said plate member.

6. The closure plug of claim 5 wherein said means for urging consists of a threaded bolt and wing nut.

* * * * *